Jan. 17, 1956  M. LUDWINSKI  2,730,782
AUTOMATIC HOSE CLAMP LOCK
Filed July 15, 1952
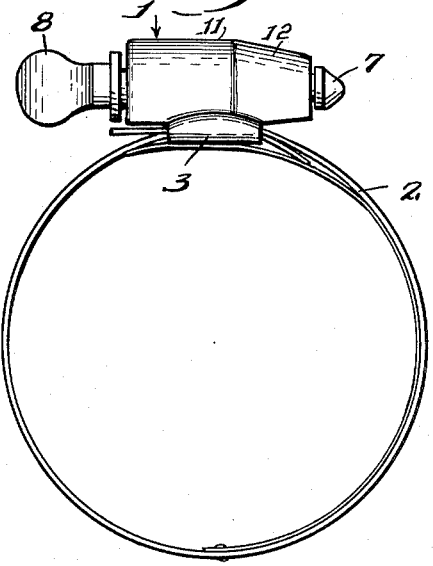
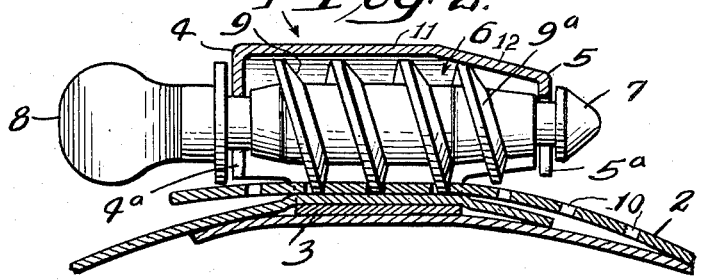
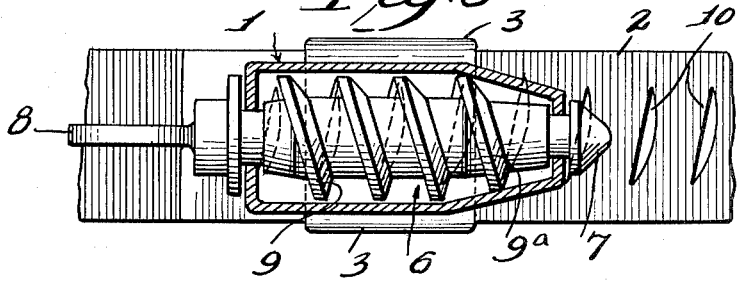
Inventor.
Mitchell Ludwinski,
By Wm F. Freudenreich,
Attorney.

United States Patent Office 2,730,782
Patented Jan. 17, 1956

2,730,782

AUTOMATIC HOSE CLAMP LOCK

Mitchell Ludwinski, Elmhurst, Ill.

Application July 15, 1952, Serial No. 298,889

1 Claim. (Cl. 24—274)

Hose clamps of the type containing floating worms enclosed in housings and meshing with threads, in the form of slots, along straps that extend through the housings, for the purpose of tightening the straps, have been found to be unreliable when used in places where they are subjected to vibration. This is due to a tilting of the worm, when the strap is drawn tight, in the direction to move the tip of the worm away from the strap while the other end moves toward the strap; thereby interfering with the meshing of the worm and the thread on the strap.

The object of the present invention is to improve such clamps so as to overcome the aforesaid fault.

A further object of the invention is to effect the improvement in operation of the said clamps without increase in the cost of their manufacture.

In carrying out my invention I so construct the housing member of the clamp that the tip end of the worm is positively held in properly meshed relation with the strap no matter how tightly the strap is drawn.

In the preferred embodiment of the invention I provide a wedge element that leaves the worm free to turn at times when it is exerting no pulling effort on the strap; but which, either through the slight distortion of the housing that occurs after a certain degree of tightness of the strap has been achieved, or through a slight lengthwise movement of the worm, or both, forces one or two turns of the worm at the tip and the wedge device into intimate contact with each other.

Not ouly does the wedge device hold the worm in mesh with the threads in or on the strap, but it offers sufficient frictional resistance to turning of the worm to prevent any accidental backing off of the latter.

The various features of novelty whereby the present invention is characterized will hereinafter be pointed out with particularity in the claim; but, for a full understanding of the invention and its various objects and advantages, reference may be had to the accompanying drawing, wherein:

Figure 1 is an elevational view of a hose clamp of a well known type, embodying the present invention.

Fig. 2 is a section on a larger scale, through the clamp, on a plane containing the axis of the worm and also the longitudinal center line of the strap.

Fig. 3 is a section taken on a plane at right angles to the plane of Fig. 2 and containing the axis of the worm; the worm appearing in elevation as is also the case in Fig. 2.

Referring to the drawing, 1 represents a sheet metal housing, preferably a stamping, that embraces and is welded to one end of a strap 2. In the particular arrangement shown the body of the housing is open at the bottom and opposed side walls have depending wings 3 which are folded underneath and lie flat against the strap; these wings being welded to the strap. This anchored strap end is therefore the effective floor or bottom of the housing. The end walls, 4 and 5, of the housing, do not reach to the floor of the housing and, therefore, provide opposed openings through which the free end of the strap may pass. These end walls are provided with central slots, 4ª and 5ª, respectively, arranged at right angles to the floor of the housing, with their bottom ends open. In these slots are entered the neck portions at opposite ends of a worm member 6. This member has at the tip end a little head 7 and at the other end a finger piece 8 for turning the same. Parts 7 and 8 are on the outside of the housing and serve as stops to limit endwise movement of the worm.

Thread 9 on the worm enters transverse slits 10 distributed along the strap for any desired distance inwardly from the free end of the latter.

Except as will now be explained, all of the parts, as heretofore described, are old and well known.

In accordance with the present invention, the housing is provided with means that starts a wedging action on one or more turns of the helical thread on the worm member as soon as a substantial load is imposed on that member upon tightening the clamp, such action increasing with the load. In the arrangement shown, the wedge device is a part of the housing itself. In this general type of clamp the upper half of the housing has usually taken the form of an inverted semi-cylindrical trough. In my housing this arched part 11 of the housing is changed to a frusto-conical shape 12 over the tip end of the worm, the smallest diameter being at the end of the housing. Usually the first turn or two of the thread on the worm member are smaller in diameter than the rest of the thread. In that case the frusto-conical roof over this part of the worm is made to lie close to the surafce of revolution produced by the latter. If worms are to be specially made, then one or two turns at the tip end are fashioned to produce a surface of revolution complementary to the frusto-conical part of the housing.

When the housings are sheet metal stampings, sufficient distortion may take place when the worm is exerting a strong pull to jam the tip end of the worm into engagement with the overlying frusto-conical wall and thus lock the worm in properly meshed relation to the strap. When the worm is allowed to have a slight end play, as shown, the worm will automatically enter the braking or locking position as soon as the strap is tightened to a predetermined degree. It should be noted that the distortion to which reference has just been made need not be permanent, the elasticity of the material of which the housing is made causing the housing to assume its original shape when the worm is again intentionally unscrewed.

Although I have shown a construction in which the taper produced in the housing by the frusto-conical portion is very considerable, tapering to a lesser degree will also be sufficient; the degree of tapering depending on the amount of wedging action desired and the available relative movements lengthwise of the worm, between the worm and the tapered part of the housing.

The clamp is applied to a hose or other object in the usual way, the worm being loose and offering no material resistance to turning until it begins to pull the strap into a first gripping relation to the object surrounded thereby. As the strap tightens about the object the pulling force increases progressively. When the strap becomes fully tightened, the tip end of the worm has been drawn into what may be termed a tapered socket and has become wedged into the same; so that the worm offers substantial resistance even to intenional rotation in the direction to release the clamp. At the same time, the worm is being held against the strap with maximum contact between the cooperating threads.

While I have illustrated and described in detail only a a preferred embodiment of my invention, I do not intend to be limited to such details except to the extent pointed out in the appended claim.

I claim:

A housing for a hose clamp in which a floating worm extends through and is supported by the housing in position to pull on a strap passing through the housing underneath the worm: which housing has a top wall composed of a semicylindrical section merging into a frustoconical section, the latter section overlying and extending beyond the tip end of the worm and being of a diameter at its small end less than the diameter of the thread elements at and near the tip, and the diameter of the inner surface of the semicylindrical section being at least as great as the greatest diameter of the worm.

References Cited in the file of this patent

UNITED STATES PATENTS

| | | |
|---|---|---|
| 2,452,806 | Tetzlaff | Nov. 2, 1948 |

FOREIGN PATENTS

| | | |
|---|---|---|
| 336,007 | France | Dec. 28, 1903 |
| 586,235 | Great Britain | Mar. 12, 1947 |
| 266,906 | Italy | Aug. 17, 1929 |